United States Patent
Wiell et al.

(10) Patent No.: US 11,002,693 B2
(45) Date of Patent: May 11, 2021

(54) HARD X-RAY PHOTOELECTRON SPECTROSCOPY SYSTEM

(71) Applicant: Scienta Omicron AB, Uppsala (SE)

(72) Inventors: Tomas Wiell, Uppsala (SE);
Christopher Liljenberg, Uppsala (SE);
Pål Palmgren, Järfälla (SE)

(73) Assignee: Scienta Omicron AB, Uppsala (SE)

( * ) Notice: Subject to any disclaimer, the term of this patent is extended or adjusted under 35 U.S.C. 154(b) by 0 days.

(21) Appl. No.: 16/506,168

(22) Filed: Jul. 9, 2019

(65) Prior Publication Data
US 2021/0010960 A1    Jan. 14, 2021

(51) Int. Cl.
| G01N 23/2273 | (2018.01) |
| H01J 35/06 | (2006.01) |
| G21K 1/06 | (2006.01) |
| H01J 49/44 | (2006.01) |
| H01J 49/06 | (2006.01) |

(52) U.S. Cl.
CPC ........... *G01N 23/2273* (2013.01); *G21K 1/06* (2013.01); *H01J 35/064* (2019.05); *H01J 49/06* (2013.01); *H01J 49/44* (2013.01); *G21K 2201/062* (2013.01); *G21K 2201/064* (2013.01); *G21K 2201/067* (2013.01)

(58) Field of Classification Search
CPC ... H01J 35/064; G01N 23/225; G01N 23/227; G01N 23/2276; G01N 23/2273
USPC ................................................. 250/305, 306
See application file for complete search history.

(56) References Cited

U.S. PATENT DOCUMENTS

| 4,737,639 A * | 4/1988 | Rusch | H01J 49/022 |
| | | | 250/305 |
| 2006/0072702 A1* | 4/2006 | Chapman | G01N 23/046 |
| | | | 378/73 |
| 2016/0327499 A1* | 11/2016 | Kobayashi | G01N 23/2273 |
| 2019/0293578 A1* | 9/2019 | Gellineau | G03F 7/70625 |

OTHER PUBLICATIONS

Regoutz et al., "A Novel Laboratory-Based Hard X-Ray Photoelectron Spectroscopy System", Review of Scientific Instruments, 89, 2018, pp. 073105-1-073105-10.

* cited by examiner

*Primary Examiner* — Jason L McCormack
(74) *Attorney, Agent, or Firm* — Morrison & Foerster LLP

(57) ABSTRACT

The present invention relates to a hard X-ray photoelectron spectroscopy (HAXPES) system comprising an X-ray tube, an X-ray monochromator, and a sample. The X-ray tube provides a beam of photons, which via the X-ray monochromator is directed through the system so as to excite electrons from the illuminated sample. The X-ray tube is connected to a monochromator vacuum chamber in which the X-ray monochromator is configured to monochromatize and focus the beam onto the sample. The monochromator vacuum chamber is connected to an analysis vacuum chamber, the illuminated sample being mounted inside the analysis vacuum chamber and the analysis vacuum chamber being connected to an electron energy analyser. The electron energy analyser is mounted onto the analysis vacuum chamber. Further, the beam of photons provided from the X-ray tube is divergent and has an energy above 6 keV. The X-ray monochromator also comprises a curved optical element arranged to both monochromatize and focus the diverging beam of photons.

13 Claims, 2 Drawing Sheets

HARD X-RAY PHOTOELECTRON SPECTROSCOPY SYSTEM

TECHNICAL FIELD

The present invention relates to an arrangement in a hard X-ray photoelectron spectroscopy (HAXPES) system with a monochromated, micro-focused X-ray source that is configured to provide photons. HAXPES, which is the established acronym for this experimental technique, uses X-rays with photon energies above 6 keV to excite photo-electrons. The excited photo-electrons are analysed to study for example properties relating to their chemical environment and electronic structure of materials.

BACKGROUND ART

To date, the majority of HAXPES experiments for different scientific and industrial purposes have been conducted on the approximately only 20 existing beamlines situated at synchrotrons worldwide. These few synchrotrons around the world are very large-scale facilities and belong to national laboratories. The small number of available beamlines and related instrumentation, the significant costs for operating them and associated access limitations, have restricted the amount of output and development efforts of the HAXPES technique. The main reason for HAXPES being confined to synchrotrons is the dramatic decrease in photo-ionisation cross sections with an increase in X-ray energy. In order to counteract said decrease in photo-ionisation, highest possible X-ray intensities combined with highly efficient photoelectron analysers with, in relative terms, very large acceptance angles are necessary.

Even though HAXPES is also afflicted with certain limitations, just as all other experimental techniques, there is a strong motivation to pursue this technique, including the ability to study bulk materials, buried layers and interfaces, and samples without any need of surface preparation. These measurements are enabled by the increase in information-depth with increasing photon energy.

The previously mentioned lack of wide ranging access to HAXPES facilities combined with a large number of potential applications is a strong motivation to develop the laboratory-based HAXPES system here described. Up to now, the development of laboratory systems has been impeded particularly by the limited availability of high intensity, monochromated X-ray sources and large angle, high-energy analysers. Therefore, only a very small number of systems have been developed so far, and then with a significantly lower maximum photon energy of 5.4 keV (Cr Kα).

In addition to the much higher photon energy, the laboratory-based HAXPES system according to the present invention comprises three separate vacuum chambers: 1) a monochromator chamber housing a monochromating optical element, 2) an X-ray tube housing an electron gun and a jet of liquid Gallium, and 3) an analysis chamber housing the photo-electron energy analyser and a fast-entry load lock in which the sample to be analysed is introduced into the vacuum system.

As mentioned initially, prior to the laboratory-based HAXPES system here described, synchrotron light sources have been in use to create X-rays for photo-electron spectroscopy experiments at the same high excitation energies. Such experiments are normally placed in a separate room, not accessible during experiments due to the harmful radiation levels. Experiment control is therefore normally made remotely. Other types of equipment in which these high excitation energies typically are used are in X-ray diffractometers. These types of experiments are normally enclosed in a cabinet, housing all instrumentation and by its size and thickness forming radiation protection.

Due to the demands on the setup, especially relating to operation and safety, the complexity on the construction of a HAXPES system increase with an increased size and maximum photon energy.

Thus, there is a need to address the difficulties in HAXPES system design associated with increased maximum photon energy in a compact embodiment.

SUMMARY OF THE INVENTION

It is an object of the present invention to alleviate at least some of the mentioned problems and impediments associated with currently existing experimental techniques and related equipment.

This object is achieved by means of a hard X-ray photoelectron spectroscopy (HAXPES) system, in particular a laboratory-based system, comprising an X-ray tube, an X-ray monochromator, and a sample. The X-ray tube provides a beam of photons, which via the X-ray monochromator is directed through the system so as to excite electrons from the illuminated sample. The X-ray tube being connected to a monochromator vacuum chamber in which the X-ray monochromator is configured to monochromatize and focus the beam onto the sample. The monochromator vacuum chamber is connected to an analysis vacuum chamber, the illuminated sample being mounted inside the analysis vacuum chamber and the analysis vacuum chamber being connected to an electron energy analyser. The electron energy analyser is mounted onto the analysis vacuum chamber.

Further, the beam of photons provided from the X-ray tube is having an energy above 6 keV, wherein the beam of photons provided from the X-ray tube is diverging. The X-ray monochromator does also comprise a curved optical element arranged to both monochromatize the diverging beam of photons and focus the diverging beam of photons.

By utilizing a curved optical element which both monochromatizes and focuses the beam of photons, a more compact illumination system may be realized. By this, a more compact HAXPES system may be realized. In addition, by utilizing the present concept less components can be used, thereby a more robust system may be designed. By having a compact system, the monochromator vacuum chamber may be smaller, thereby simplifying construction and limiting the vacated volume.

The laboratory-based HAXPES system according to the invention may for example be provided with a monochromated, micro-focused Ga Kα X-ray source giving a photon energy of 9.25 keV. The energy level of this X-ray source differentiates it from all other comparable systems, known in the technical field.

Moreover, the invention also relates to an improved design and new fields of applicability of a laboratory-based HAXPES system that utilizes a high energy, monochromated Ga X-ray source with an excitation energy of 9.25 keV.

The combination of a powerful X-ray tube with an efficient and stable monochromator and an electron energy analyser with a wide acceptance angle results in excellent performance. Basic characteristics of the spectrometer here described is the ability to provide measurement results with a minimum energy resolution of 465 meV.

Data obtained from samples of scientific relevance, including measurement of bulk and hetero-structure samples displays that high-quality data can be collected, both in terms of energy resolution and intensity.

The HAXPES system according to the invention further delivers data collected with a hard X-ray energy source previously only accessible at synchrotrons. Results from this system are able to produce independent, complete datasets as well as supporting other experiments e.g., energy-dependent synchrotron work through preliminary experiments in the laboratory. In practice, this means that the improved system will be versatile and both vertically and horizontally applicable, and of significant importance in several scientific fields of present and future relevance.

In embodiments, the curved optical element may be a curved crystal.

The curved crystal may operate through a diffraction process according to Braggs law, that gives the angles for coherent and incoherent scattering from a crystal lattice. Bragg diffraction occurs when radiation from the X-ray source is scattered in a by the atoms of a crystal lattice, and undergoes constructive interference.

There is however a limit to how far a crystal may be bent while still operating as a crystal lattice to monochromatize X-ray radiation of a specific wavelength and/or energy. Should a crystal be bent too far, the X-ray beam will no longer view the crystal as a lattice. Should the crystal however not be bent enough, the crystal may not be able to focus the X-ray beam. In addition, the size of the system may be then be ungainly increased, bulky and impractical.

In embodiments, the curved crystal may be arranged on a substrate. By having a substrate that may have a more robust composition and/or design than the crystal, production and handling may be improved.

In embodiments, the curved optical element may comprise Si-642.

In embodiments, the curved optical element may have a radius to produce a Rowland circle of 400-700 mm, preferably 550 mm.

In embodiments, the curved optical element may have a radius to produce a Rowland circle of 500-600 mm, preferably 550 mm.

In embodiments, the curved optical element may have a radius to produce a Rowland circle of 540-560 mm, preferably 550 mm.

A Rowland circle for a curved optical element having a first radius may have a radius that is half the first radius. Hence, a Rowland circle for a curved optical element will have a diameter that is equal to the radius of the curved optical element.

In embodiments, the electron energy analyser may be mounted onto the analysis vacuum chamber, in such a way that an entrance slit of the electron energy analyser is essentially aligned in the energy dispersive plane of the X-ray footprint.

In embodiments, the electron energy analyser may be of the hemispherical electron energy analyser type. The details of a hemispherical electron energy analyser and the construction thereof is considered to be known in the art.

In embodiments, the hemispherical analyser may be mounted onto the analysis vacuum chamber, in such a way that an entrance slit of the hemispherical analyser is essentially aligned in the energy dispersive plane of the X-ray footprint. The term footprint refer to the part of a surface that is illuminated by a beam.

In embodiments, the photon energy of the X-ray source may be 9.25 keV and originating from the characteristic Kα radiation from a Ga alloy.

The term "Ga" refer to the chemical element gallium.

In embodiments, the X-ray tube may comprise an electron gun that excites liquid Ga, wherein the electron gun may have a tube voltage above 60 kV, preferably at least 70 kV. The electron gun is an example of an electron emitter and is an electrical component that may produce an electron beam. The tube voltage may be connected across a cathode and an anode of the X-ray tube to accelerate the electrons. Details of the utilizations of an electron gun in a X-ray tube is considered to be known in the art.

In embodiments, the system may further comprise a heating apparatus arranged to heat the optical element to an elevated temperature.

It is understood that an X-ray tube is an example of an X-ray source.

It is understood that the above-mentioned embodiments may be combined.

DETAILED DESCRIPTION

The present invention can be used to measure gas which overcome or at least mitigate the problems of the prior art and with an improved functionality in a more efficient construction that among others provide reliability benefits.

Figure 1:
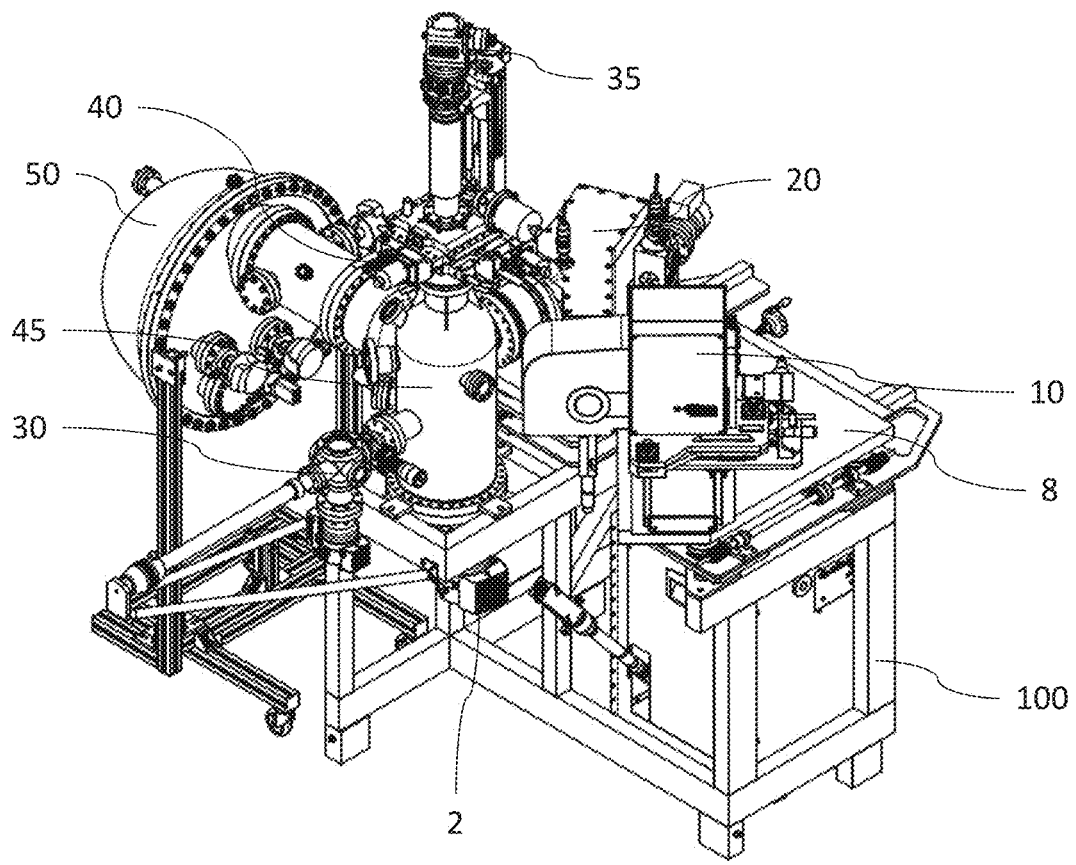
FIG. 1 is a front side overview of a laboratory-based HAXPES system.
Figure 2:
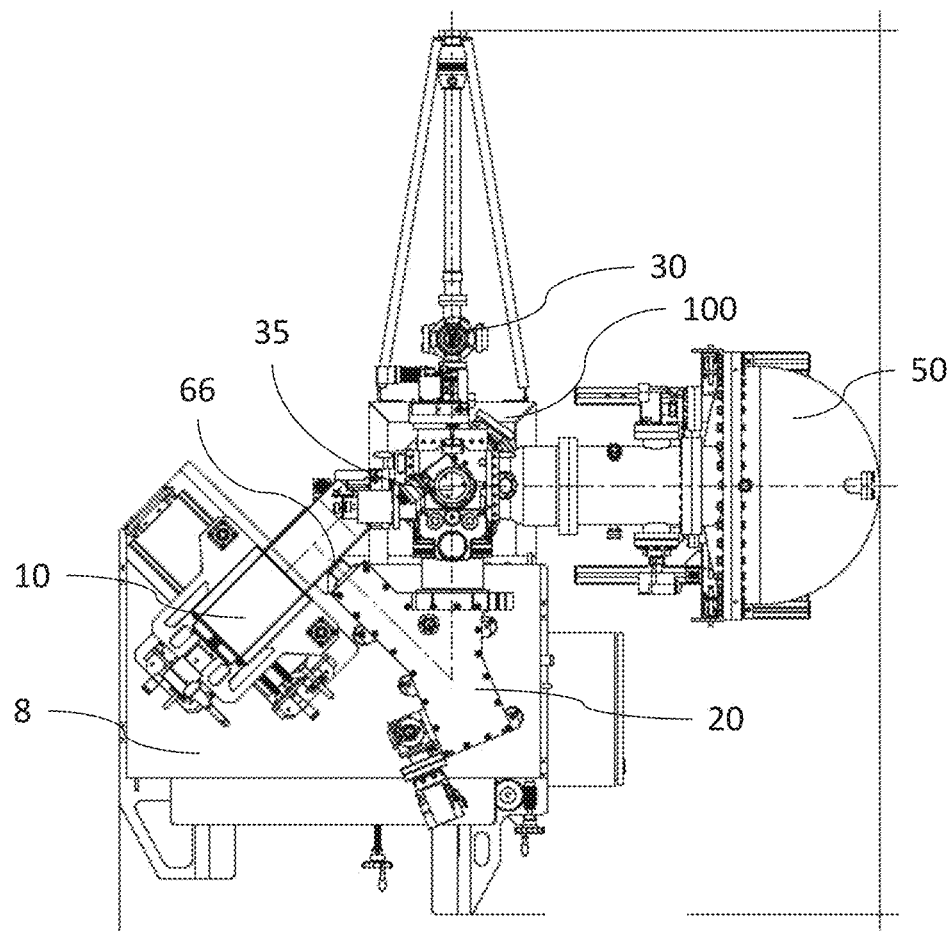
FIG. 2 depicts the system of FIG. 1, although this overview perspective is from the top.

The invention is described in the following illustrative and non-limiting detailed description of exemplary embodiments, with reference to the appended drawings, wherein:

FIGS. 1 and 2 respectively show a front and a top side overview of a laboratory-based HAXPES system prototype, the system places on a base 100. Some features are best viewed from the front perspective, and some are best viewed from the top perspective. The features shown include a pumping system 2, which is connected to a control system, a radiation safety system and tables 8 for adjustments in three dimensions of an X-ray source, such as an X-ray tube 10. The X-ray source illuminates an X-ray monochromator 20 from which the monochromated X-ray beam is directed onto a sample, which was introduced into the vacuum system via the load lock 30. A manipulator 35 is provided with XYZ and ±180° rotation, and preferably also heating capability, and a camera system 40 is provided for precise orientation and sample navigation. The above-mentioned parts are connected to the analysis vacuum chamber 45, in which the sample is located during analysis. An electron analyser 50 is provided, preferably of the hemispherical electron energy analyser type. To match the energy resolution of the X-ray source and to collect as much of the photo-electron signal as possible, a hemispherical electron analyser with a very large acceptance angle would be the preferred solution. However, other types of analysers, such as sector hemispheres, cylindrical mirror analysers and retarding field analysers, cannot be excluded even if the energy resolution would most likely be insufficient for those purposes.

With particular reference to FIG. 2, the system as in FIG. 1 is shown, but drawn from the top view.

The laboratory-based HAXPES system according to the present invention consists of three separate vacuum chambers: an X-ray tube, a monochromator chamber, and an analysis chamber, some of which have been briefly discussed above. A hemispherical electron energy analyser is attached to the analysis chamber, preferably with its entrance slit oriented in the horizontal plane. The X-ray tube provides a beam of photons that is diverging, the X-ray tube is connected to the monochromator vacuum chamber. In the monochromator vacuum chamber the X-ray monochromator is configured to monochromatize and focus the diverging beam onto the sample. The monochromator vacuum chamber is in turn connects to the analysis vacuum chamber. The illuminated sample being mounted inside the analysis vacuum chamber and the analysis vacuum chamber being connected to an electron energy analyser. The electron energy analyser is in turn mounted onto the analysis vacuum chamber. Essential system parameters are controlled through a programmable logic controller (PLC) user interface allowing regulation of at least one of the vacuum system, safety interlocks, bake-out settings, and monochromator crystal temperature.

In order to both monochromatize the diverging beam of photons and focus the diverging beam of photons, the X-ray monochromator may comprise a curved optical element. The curved optical element may for example be a curved crystal arranged to have a radius to produce a Rowland circle 550 mm.

The electron energy analyser may be mounted onto the analysis vacuum chamber in such a way that an entrance slit of the electron energy analyser is essentially aligned in the energy dispersive plane of the X-ray footprint.

The photon energy of the X-ray source may for an example be 9.25 keV and originating from the characteristic K$\alpha$ radiation from a Ga alloy. The X-ray tube may comprise an electron gun that excites liquid Ga, wherein the electron gun may have a tube voltage above 60 kV, preferably at least 70 kV.

The system may also comprise a heating apparatus arranged to heat the optical element to an elevated temperature.

A more detailed overview of the design of the vacuum system and the load lock shows that the vacuum system comprises three separate turbo pumps situated on the load lock, analysis chamber and monochromator chamber. The load lock and monochromator chamber could have 80 L s$^{-1}$ turbo pumps (Pfeiffer HiPace 80), and the analyser chamber has a 300 L s$^{-1}$ turbo pump (Pfeiffer HiPace 300). The turbo pumps may all share one 6.2 m$^3$h$^{-1}$ oil-free backing pump (Edwards nXDS6i) and could be separated by automatic valves. This efficient configuration is made possible through the PLC control of the entire vacuum system, including pumps, valves, and gauges. In addition, the analysis chamber may house a titanium sublimation pump (VACGEN ST22).

The load lock has a standard transfer pressure of <1×10$^{-7}$ mbar, which by means of the above-exemplified vacuum system configuration will be routinely reached within 30 min. The load lock is fitted with a linear, magnetic coupled transfer arm used to transfer samples from the load lock into the analysis vacuum chamber. It also has a multi-sample storage holder that can carry up to five samples mounted on Omicron flag-style sample plates, which are well-known to scientists in the field.

The analysis vacuum chamber may be made from mu-metal and typically has a base pressure of <5×10$^{-10}$ mbar. Samples may be transferred from the load lock onto a 4-axis manipulator (VACGEN Omniax 200) of the analysis chamber. The rotational movement of the manipulator allows measurements at different sample angles, including grazing incidence geometry. A hemispherical electron energy analyser (Scienta Omicron EW4000) is mounted horizontally onto the analysis chamber, with the entrance slit being horizontally aligned.

The monochromator chamber is preferably connected to the analysis chamber via a flexible bellow 94 allowing precise alignment of the monochromated X-rays. A Kapton window 68, 96 separates the vacuum volumes of the monochromator from the analysis chamber. The analysis chamber is fitted with extra ports for further equipment, including but not limited to charge neutralisers, sputter guns (e.g., gas cluster ion beam sources), and additional X-ray tubes (e.g., monochromated Al K$\alpha$).

Conceivably, the X-ray tube for providing the X-ray radiation is an Excillum MetalJet-D2+ 70 kV, which is based on a Ga metal-jet anode. Ga is recirculated in a closed metal-jet loop and hit by an electron beam with an 80×20 µm$^2$ spot size and an intensity of 250 W, which is generated by an electron gun (70 kV). X-rays are then monochromated and focused onto the sample by a curved optical element. The crystal may be kept at a constant, elevated temperature to give optimum performance, including high spectral resolution and intensity, as well as long-term stability. The curved optical element may for example be a curved crystal that may comprise Si-642.

The entire setup is mounted and could be pre-aligned on an optical table, which advantageously is fully adjustable in x, y, and z. This freedom of movement is necessary to precisely align the X-ray spot with respect to the field of view of the analyser.

The mentioned Scienta Omicron EW4000 hemispherical electron energy analyser used in this experimental setup has a maximum measurable kinetic energy of 12 keV. It has a large acceptance angle of 60°, giving high measurement intensities. The hemisphere has a radius of 200 mm and a working distance of 40 mm. Pass energies are available across a wide range from 2 to 1000 eV, with energies of 10-500 eV used routinely. The entrance slit of the hemisphere is horizontal with respect to the X-ray footprint on the sample, giving maximum intensity. The analyser may further be equipped with nine straight entrance slits varying in dimensions from 0.1 to 4 mm. The 2D-detector setup consists of a multi-channel plate (MCP), phosphor screen, and CCD camera. The detector simultaneously covers 9.1% of the pass energy.

All of the above described components, settings and experimental configurations are conceivable for use, and even though they have been proven to work in practice, they are given merely as examples. It is to be understood that none of them needs to be fixed, and components and settings could be possibly be adjusted or replaced without adversely affecting the inventive system or its functionality.

The system performance with respect to energy resolution, X-ray spot size vs. intensity, X-ray power vs. intensity and stability has been shown to be more than satisfying. For a more in-depth discussion on system performance and an outline of scientific applications, further reference is made to Regoutz et al., *Review of Scientific Instruments*, 89, 073105 (2018).

In case a gas is used having a pressure lower than ambient air pressure, a pressure which is obtainable by means of a vacuum pump, a reduced number of collisions between gas particles and X-rays can be expected and thus, less absorption of X-ray radiation, especially for lower energy X-ray radiation. Also contamination on the experimental equipment, in particular Kapton windows, is reduced. The lifetime of the windows are thus expected to increase, which is beneficial at least for the reduced service and maintenance requirement on the system. This has also the additional advantage of potentially reducing the required thickness of encapsulating Kapton windows, since the difference in pressure between the vacuum chambers and the housing encapsulating the gap and radiation trap/traps requires corresponding material thicknesses to avoid imploding windows. A reduced thickness gives the advantage of less absorption and thus a potentially higher X-ray radiation flux. As an alternative given the lower pressure difference, other X-ray window materials can be considered with different strength and transmission properties.

On the other hand, if a pressure higher than the ambient air pressure is used, a pressure which is obtainable be means of a pressurizing pump, a gas can be introduced into the housing by means of so-called purging. The previous gas is thereby replaced by the introduced gas, which could be beneficial when nitrogen as an inert gas replaces air. The higher pressure also allows a filter arrangement to be used for filtering the gas before introduction. This may thus lead to less contamination.

As yet another embodiment, the gas pressure may be the same as or similar to the ambient air, i.e. the air outside of the housing.

The invention claimed is:

1. A hard X-ray photoelectron spectroscopy (HAXPES) system, comprising:
   an X-ray tube providing a beam of photons, which, via an X-ray monochromator, is directed through the system so as to excite electrons from an illuminated sample,
   the X-ray tube being connected to a monochromator vacuum chamber, in which the X-ray monochromator is configured to monochromatize and focus the beam onto the sample,
   the monochromator vacuum chamber is connected to an analysis vacuum chamber,
   the illuminated sample being mounted inside the analysis vacuum chamber,
   the analysis vacuum chamber being connected to an electron energy analyser, which is mounted onto the analysis vacuum chamber,
   wherein
   the beam of photons provided from the X-ray tube has an energy above 6 keV, wherein the beam of photons provided from the X-ray tube is diverging;
   the X-ray monochromator comprises a curved optical element arranged to both monochromatize the diverging beam of photons and focus the diverging beam of photons; and
   the curved optical element has a radius to produce a Rowland circle of at least 500 mm and less than 700 mm.

2. The system according to claim 1, wherein the curved optical element is a curved crystal.

3. The system according to claim 1, wherein the curved optical element comprises Si-642.

4. The system according to claim 1, wherein the electron energy analyser is of the hemispherical electron energy analyser type.

5. The system according to claim 4, wherein the hemispherical analyser is mounted onto the analysis vacuum chamber, in such a way that an entrance slit of the hemispherical analyser is essentially aligned in the energy dispersive plane of the X-ray footprint.

6. The system according to claim 1, wherein the photon energy of the X-ray tube is 9.25 keV and originating from the characteristic $K\alpha$ radiation from a Ga alloy.

7. The system according to claim 1, wherein the X-ray tube comprises an electron gun that excites liquid Ga, and wherein the electron gun has a tube voltage above 60 kV.

8. The system according to claim 1, further comprising a heating apparatus arranged to heat the optical element to an elevated temperature.

9. The system according to claim 1, wherein the system is a laboratory-based system.

10. The system according to claim 1, wherein the curved optical element has a radius to produce a Rowland circle of 550 mm.

11. The system according to claim 7, wherein the electron gun has a tube voltage of at least 70 kV.

12. The system according to claim 1, wherein the curved optical element has a radius to produce a Rowland circle of 500 mm to 600 mm.

13. The system according to claim 1, wherein the curved optical element has a radius to produce a Rowland circle of 540 mm to 560 mm.

* * * * *